US012211639B2

(12) United States Patent
Chen et al.

(10) Patent No.: US 12,211,639 B2
(45) Date of Patent: Jan. 28, 2025

(54) EMBEDDED TEMPERATURE SENSOR SOLUTION FOR POWER INDUCTOR

(71) Applicant: FORD GLOBAL TECHNOLOGIES, LLC, Dearborn, MI (US)

(72) Inventors: Lihua Chen, Farmington Hills, MI (US); Boris Curuvija, West Bloomfield, MI (US); Baoming Ge, Okemos, MI (US); Moon Young Lee, Livonia, MI (US); Fan Wang, Novi, MI (US); Serdar H. Yonak, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 325 days.

(21) Appl. No.: 17/537,963

(22) Filed: Nov. 30, 2021

(65) Prior Publication Data

US 2023/0170137 A1 Jun. 1, 2023

(51) Int. Cl.
*H01F 27/40* (2006.01)
*H01F 27/32* (2006.01)

(52) U.S. Cl.
CPC ......... *H01F 27/402* (2013.01); *H01F 27/325* (2013.01); *H01F 2027/406* (2013.01)

(58) Field of Classification Search
CPC ........ H01F 27/12; H01F 27/32; H01F 27/325; H01F 27/402; H01F 2027/406
USPC ........................................................... 361/37
See application file for complete search history.

(56) References Cited

U.S. PATENT DOCUMENTS

| | | | | |
|---|---|---|---|---|
| 4,491,819 | A | 1/1985 | Ray | |
| 2007/0080769 | A1 | 4/2007 | Thiel et al. | |
| 2008/0024263 | A1* | 1/2008 | Fang | H01F 17/04 336/208 |
| 2015/0091686 | A1 | 4/2015 | Ding et al. | |
| 2017/0084375 | A1* | 3/2017 | Vafakhah | H01F 27/12 |
| 2017/0352476 | A1* | 12/2017 | Inaba | H01F 27/324 |
| 2018/0166201 | A1* | 6/2018 | Vafakhah | H01F 27/06 |
| 2022/0181076 | A1* | 6/2022 | Wang | H01F 27/02 |

FOREIGN PATENT DOCUMENTS

| | | |
|---|---|---|
| CN | 101552108 B | 11/2012 |
| CN | 205751857 U | 11/2016 |

* cited by examiner

*Primary Examiner* — Yemane Mehari
(74) *Attorney, Agent, or Firm* — David B Kelley; Brooks Kushman P.C

(57) ABSTRACT

A power inductor such as a variable voltage converter power inductor having a temperature sensor embedded therein is disclosed. In one or more embodiments, the sensor may be disposed between the core and the coil or winding. The sensor may be positioned in the cavity of a bobbin or the core itself.

20 Claims, 4 Drawing Sheets

EMBEDDED TEMPERATURE SENSOR SOLUTION FOR POWER INDUCTOR

TECHNICAL FIELD

The present disclosure relates to improved monitoring of a power inductor and more specifically a variable voltage converter (VVC) power inductor.

BACKGROUND

Advances to use alternative energy sources are underway. As these efforts and developments advance, demand for hybrid and electric vehicles is increasing. Electric vehicles and hybrid electric vehicles may utilize VVC power inductors to regulate inverter voltage. However, while operating at high power conditions, a VVC power inductor may heat up. Conventionally, the temperature of a VVC power inductor is measured by a sensor on the exterior of the VVC power inductor, as shown in FIG. 1.

SUMMARY

A power inductor is disclosed. The power inductor includes a magnetic core, first and second fixtures disposed around first and second ends of the magnetic core, an electrically conductive winding between the fixture and around the core, and a thermal sensor. The thermal sensor is disposed in a sensor-enclosure that is part of the fixture such that the thermal sensor is disposed between the magnetic core and the electrically conductive winding. The thermal sensor is configured to detect a temperature of the power inductor when in operation.

A vehicle transmission system is also disclosed. The transmission system includes a variable voltage converter (VVC) power inductor having a core, a winding disposed around the core and a temperature sensor disposed therebetween. The VVC power inductor is in electrical communication with an electrical power source such as a battery and an inverter such that the VVC power inductor regulates the voltage of the inverter. The thermal sensor is configured to monitor the temperature of the VVC power inductor during operation.

A power inductor including a magnetic core, an electrically conductive winding and a thermal sensor is disclosed. The magnetic core may have a cavity configured to house a sensor such as the thermal sensor and the thermal sensor may be disposed in the cavity. The thermal sensor may be configured to detect a temperature during operation. The electrically conductive winding surrounds the magnetic core such that the thermal sensor is disposed between the magnetic core and the electrically conductive winding.

A method of making a power inductor is disclosed. The method includes providing an inductor core, positioning a thermal sensor within an appendage of a bobbin and positioning the bobbin and an inductor coil around the inductor core. The bobbin may include first and second ends such that the first end of the bobbin is disposed around a first portion of the core and the second end of the bobbin is disposed around a second portion of the core such that the inductor coil is adjacent to and between the first and second ends of the bobbin. In other words, the inductor coil is sandwiched between the first and second ends of the bobbin. The appendage is configured to hold the sensor between the inductor core and the inductor coil.

DETAILED DESCRIPTION

Figure 1:
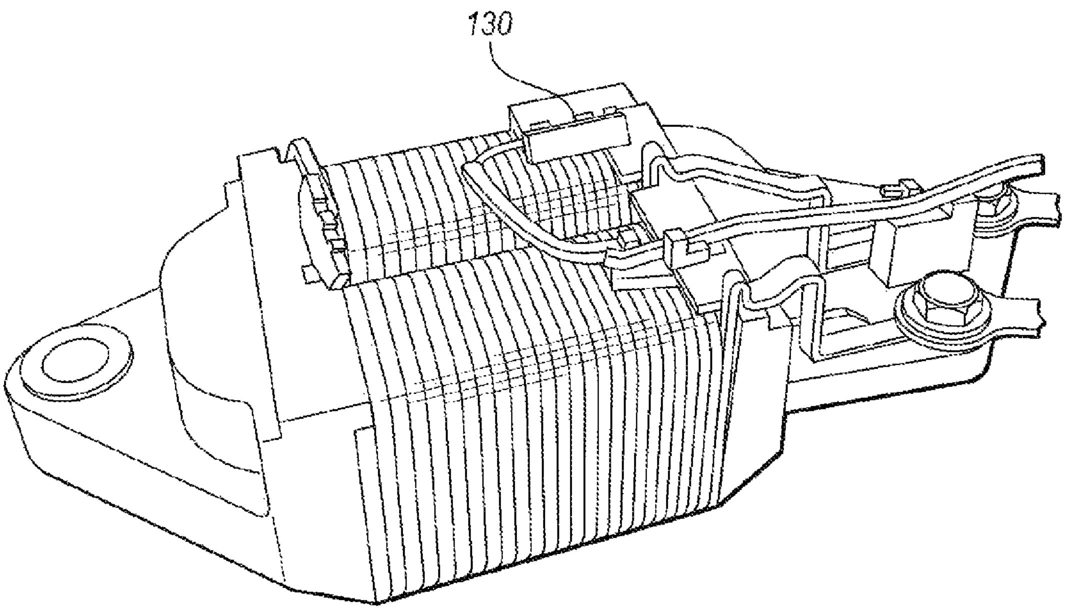
FIG. 1 (Prior Art)
FIG. 1 is a perspective view of a conventional power inductor.

Embodiments of the present disclosure are described herein. It is to be understood, however, that the disclosed embodiments are merely examples and other embodiments can take various and alternative forms. The figures are not necessarily to scale. Some features could be exaggerated or minimized to show details of particular components. Therefore, specific structural and functional details disclosed herein are not to be interpreted as limiting, but merely as a representative basis for teaching one skilled in the art to variously employ the embodiments of the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Unless expressly stated to the contrary, percent, "parts of," and ratio values are by weight; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

This disclosure is not limited to the specific embodiments and methods described below, as specific components and/or conditions may vary. Furthermore, the terminology used herein is used only for the purpose of describing particular embodiments and is not intended to be limiting in any way.

As used in the specification and the appended claims, the singular form "a," "an," and "the" comprise plural referents unless the context clearly indicates otherwise. For example, reference to a component in the singular is intended to comprise a plurality of components.

The term "substantially" or "generally" may be used herein to describe disclosed or claimed embodiments. The term "substantially" may modify a value or relative characteristic disclosed or claimed in the present disclosure. In such instances, "substantially" may signify that the value or relative characteristic it modifies is within ±0%, 0.1%, 0.5%, 1%, 2%, 3%, 4%, 5% or 10% of the value or relative characteristic.

It should also be appreciated that integer ranges explicitly include all intervening integers. For example, the integer range 1-10 explicitly includes 1, 2, 3, 4, 5, 6, 7, 8, 9, and 10. Similarly, the range 1 to 100 includes 1, 2, 3, 4 . . . 97, 98, 99, 100. Similarly, when any range is called for, intervening numbers that are increments of the difference between the upper limit and the lower limit divided by 10 can be taken as alternative upper or lower limits. For example, if the range is 1.1. to 2.1 the following numbers 1.2, 1.3, 1.4, 1.5, 1.6, 1.7, 1.8, 1.9, and 2.0 can be selected as lower or upper limits.

A power inductor is provided. The power inductor may be part of a vehicle or vehicle system such an electric vehicle (EV) or a hybrid electric vehicle (HEV). EVs and HEVs may have complicated and complex electric systems that use and store DC energy such as in a battery system. A power inductor, and more specifically a variable voltage converter (VVC) power inductor may facilitate this process. The VVC power inductor may regulate the voltage and energy received, for example, by an inverter. During high power operation the power inductor may reach high temperatures and thus accurately detecting and monitoring the temperature of the power inductor may be desired. Still further accurate temperature measurements may assist in optimizing the efficiency of these systems. But accurately measuring the temperature of certain components, such as the power inductor, is difficult. For example, the power inductor may be located in a location that is exposed to free liquids such as in a transmission system of a vehicle. The free liquids (e.g., automatic transmission fluid or oil) may come into contact with exposed thermal sensors and interfere with or disrupt measurements.

Figure 2A:
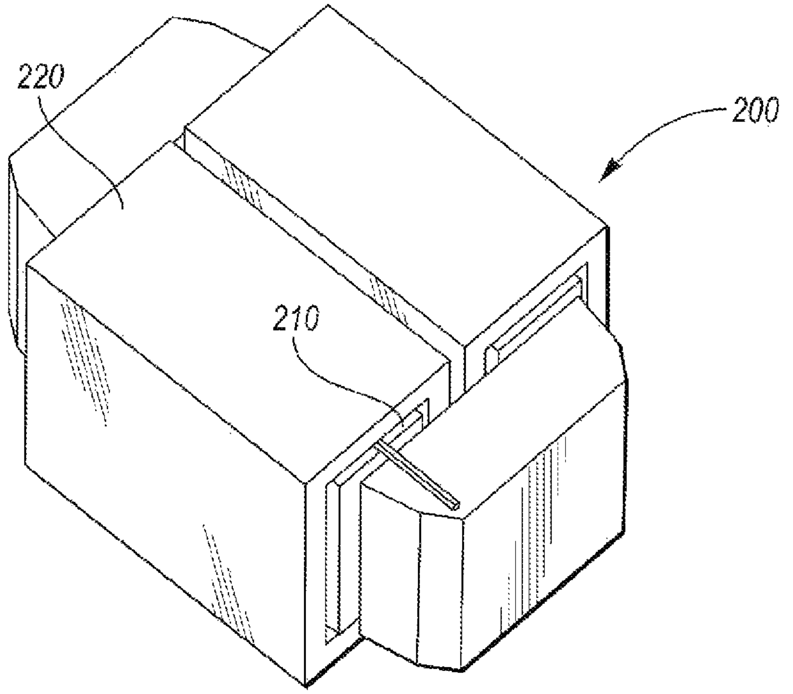
FIG. 2A is a perspective view of a power inductor having a thermal sensor embedded therein.
Figure 2B:
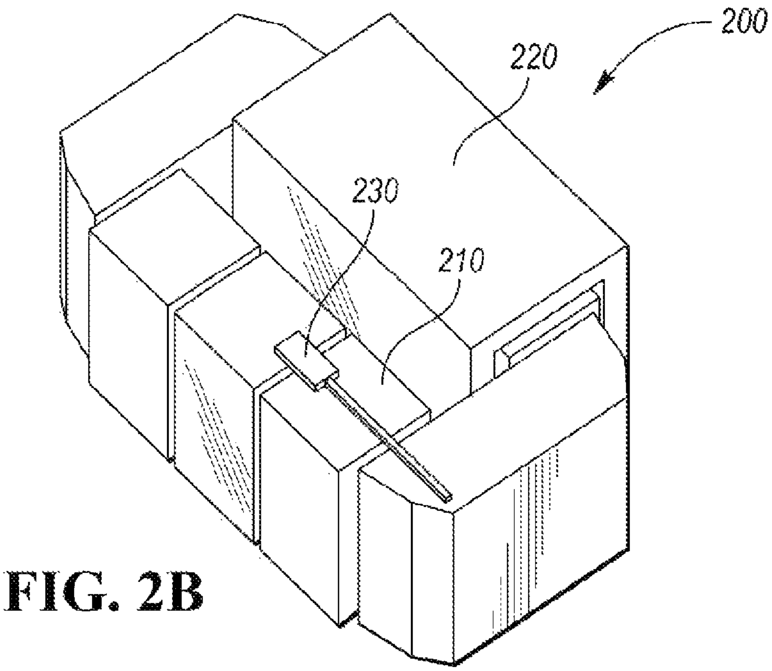
FIG. 2B is a perspective view of the power inductor of FIG. 2A with the winding or coil removed to show the embedded sensor.

In FIG. 2A, a power inductor 200 includes a core 210, a coil or winding 220 and a sensor 230 (shown in FIG. 2B) such as a thermal (i.e., temperature) sensor therebetween. Throughout this description the terms coil or winding may be used interchangeably and it should be understood that either may be substituted for the other. The power inductor may be a variable voltage converter inductor such that it converts variable voltages to a desirable voltage suitable for electrical components such as an electrical machine (e.g., electrical motor). The sensor 230 is embedded or located internally, unlike the sensor 130 of a conventional power inductor, shown in FIG. 1. Sensor 130 is located on the exterior surface rather than being internal. An embedded or internally located thermal sensor 230 may provide more accurate temperature measurements for the power inductor 200. An internal sensor may also be less susceptible to interference or disruption from external or ambient conditions. FIG. 2B shows the position of sensor 230 when the coil 220 is removed.

The power inductor core 210 is located within the coil 220 or resides in a central gap defined by the coil 220. The core 210 may be a magnetic core of, for example, steel laminates, or ferromagnetic material such as iron or ferrite or a non-magnetic core (i.e., air core) such as plastic or ceramic. A magnetic core 210 may amplify the magnetic field and inductance of the power inductor 200. The coil 220 surrounds, wraps around, or is wound around the core 210 and has first and second electrical terminals for electrical communication with other components such as an energy source (e.g., battery) and/or inverter, as well as various intermediate devices. The coil or winding 220 is electrically conductive and may be, for example, copper or silver wire. The wire may be insulated wire.

The sensor 230 may be a thermal or temperature sensor such as but not limited to a thermocouple, a thermistor, or a resistance temperature detector such that it is configured to detect or monitor a temperature of the power inductor 200 during operation. Sensor 230 may be insulated or potted to reduce interference or disruption. For example, insulation paper 232 or a potting may be used as shown in FIGS. 2D and 3C. Electrical insulation paper may reduce or mitigate electrical inference or shorting events. Alternatively, or in addition, an epoxy potting may be used to reduce electrical interference while maintaining good thermal conductivity.

Figure 2C:
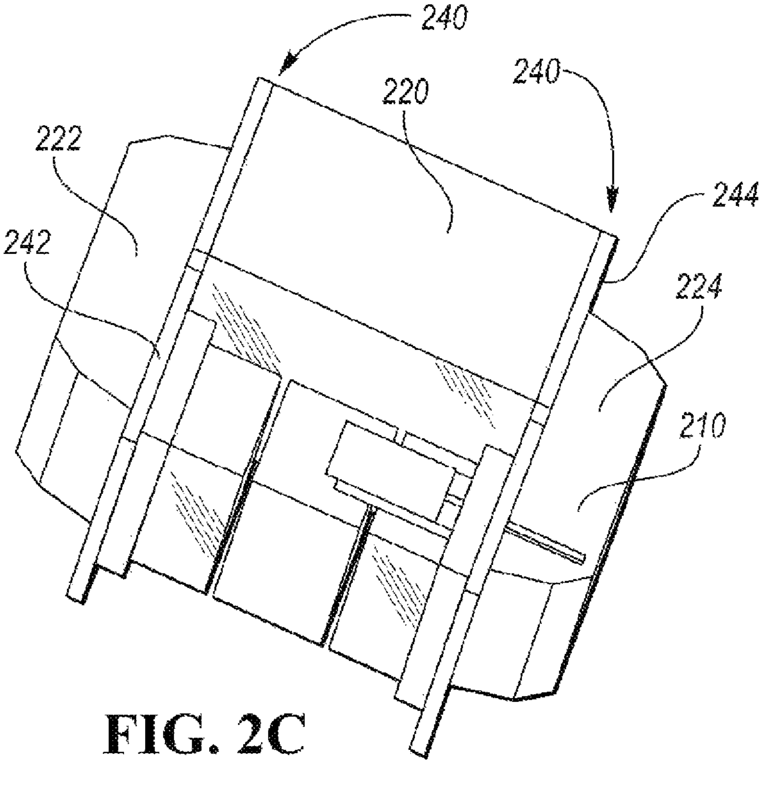
FIG. 2C is a perspective view of another power inductor having a bobbin.
Figure 2D:
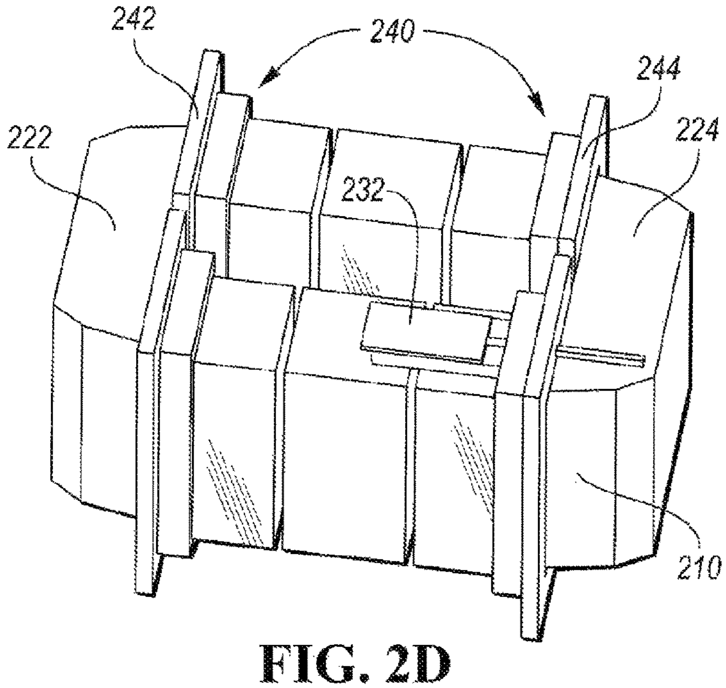
FIG. 2D is a perspective view of the power inductor of FIG. 2C with the windings or coils removed.
Figure 3A:
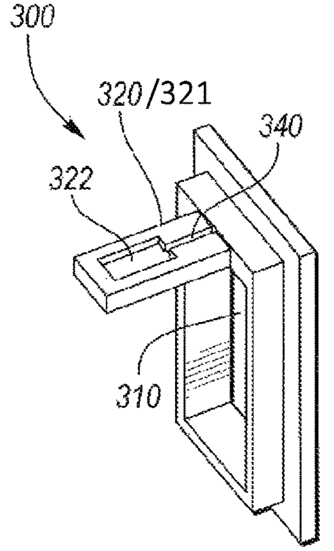
FIG. 3A-3C are perspective views of a bobbin having a fixture for positioning a sensor between the inductor core and the inductor coil or winding.
Figure 3B:
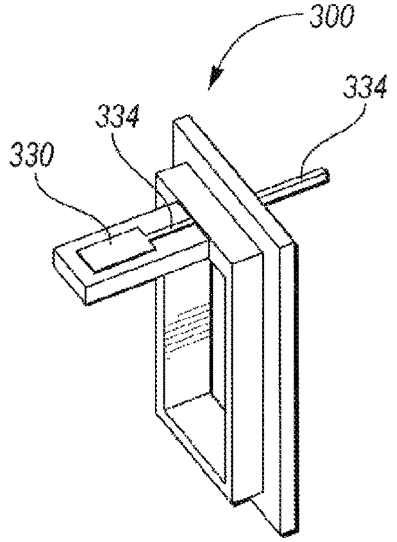
Figure 3C:
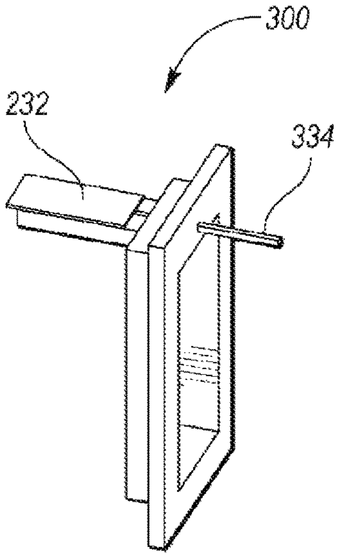

The power inductor 200 may also include a bobbin assembly 240, as shown in FIGS. 2C and 2D. The bobbing assembly 240 may combine or hold the core 210 and/or coil or winding 220 in position. The bobbin assembly 240 may be a single component or a plurality of components that may or may not be connected. For example, the bobbin assembly 240 may include a first fixture 242 disposed around a first end 222 of the core 210 and a second fixture 244 disposed around a second end 224 of the core 210. The coil 220 may be disposed or wound around the core 210 between or from the first fixture 242 to the second fixture 244 (i.e., sandwiched). In other words, the bobbin assembly 300, as shown in FIG. 3A-3C, may include a conduit, channel, or gap 310 for securing, holding, or housing the core 210. The bobbin assembly 300 (e.g., first or second fixture 242, 244) may include a member, arm, or appendage 320 that has a cavity 322 such that it forms an enclosure, encasing, or housing 321 for positioning the sensor 330 between the core 210 and coil/winding 220. In other words, the sensor 330 may be disposed in the cavity 322, enclosure, encasing, or housing such that it is between the core 210 and winding 220. The bobbin assembly 300 may also include a conduit or channel 340 for routing or housing a lead or leads 334 to and from the sensor 330. The lead or leads 334 may be connected to a controller such that the controller can reduce power to prevent overheating or engage cooling measures to reduce the temperature of power inductor 200. For example, the controller may prevent the inductor 200 from exceeding 150° C. or engage cooling measures at 100° C., or more preferably 115° C. or even more preferably 130° C. The controller may be configured to execute a series of machine instruction or computer-executable instructions stored on non-volatile storage or media.

Figure 4:
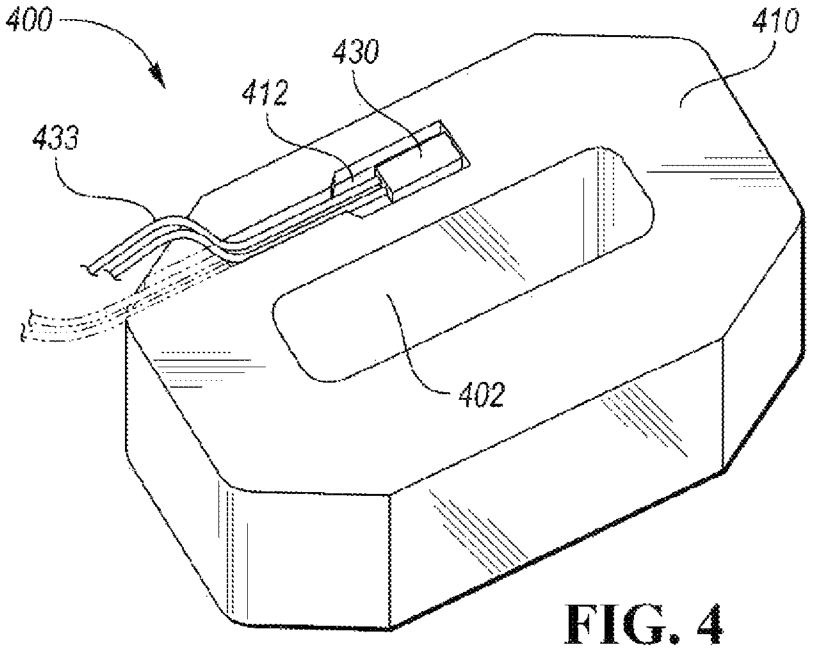
FIG. 4 is a perspective view of another power inductor having a core with a cavity and a sensor disposed therein.
Figure 5:
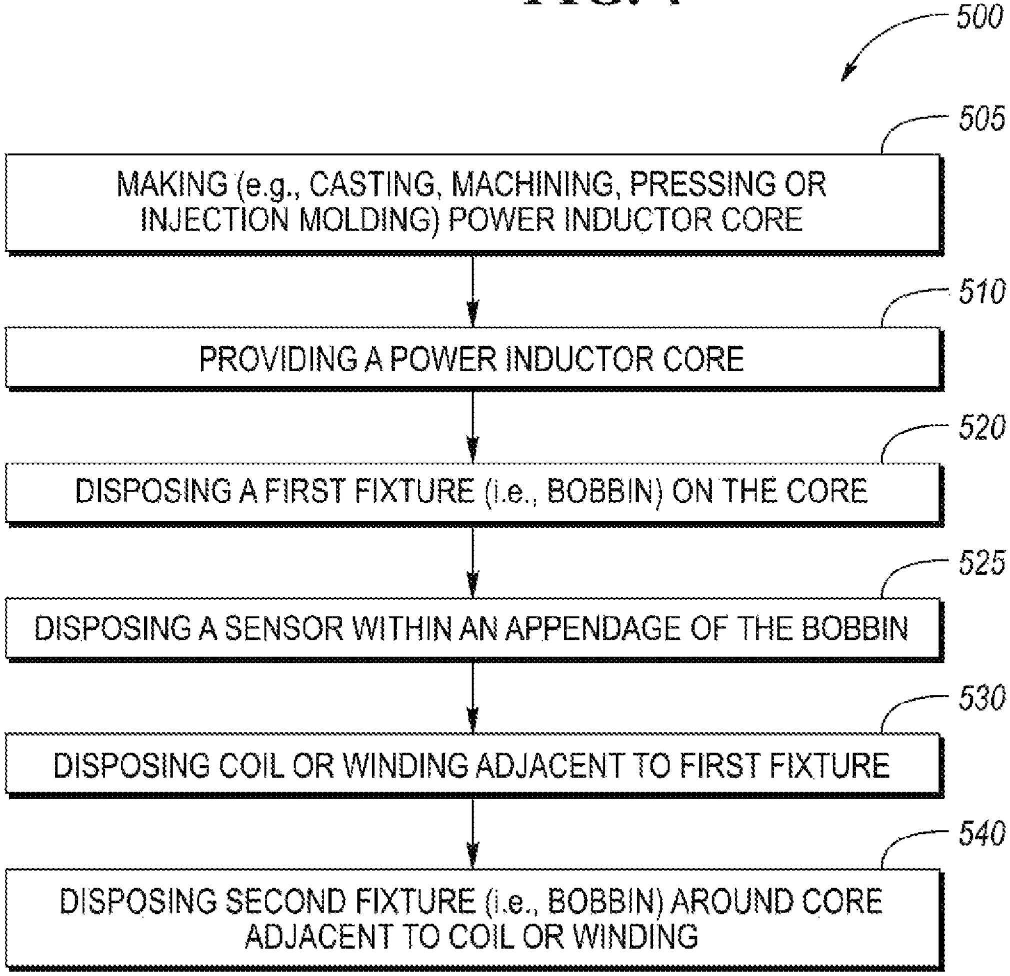
FIG. 5 includes a flowchart for a method of making a power inductor having a sensor embedded therein.

Power inductor 400 may include a core 410 and coil or winding wrapped or wound around the core 410. The core 410 may include one or more cavities 412, as shown in FIG. 4, for housing one or more sensors 430. The one or more cavities 412 may be on any surface or face of the core 410. In one variation, the cavity 412 may be located such that sensors 430 are disposed between core 410 and coil or winding. The cavity 412 may include a channel or conduit for housing the lead(s) 433 to and from the sensor 430. The channel or conduit may extend to a surface or face such that the lead(s) do not need to be unnecessarily bent. In a refinement, the cavity 412 may be located on the inner surface 402 of inductor 400 which may be the hottest region during operation.

It should be understood that one or more sensors may be included in a power inductor between the same or different faces of the core. The sensors may be disposed in a cavity in a bobbin and/or in the core itself.

The controller may include one or more devices selected from high-performance computing systems including high-performance cores, microprocessors, micro-controllers, digital signal processors, microcomputers, central processing units, field programmable gate arrays, programmable logic devices, state machines, logic circuits, analog circuits, digital circuits, or any other device that manipulate signals (analog or digital) based on computer-executable instructions residing in the memory. The memory may include a single memory device or a number of memory devices including, but not limited to, random access memory (RAM), volatile memory, non-volatile memory, static random access memory (SRAM), dynamic random access memory (DRAM), flash memory, cache memory, or any other device capable of storing information. The non-volatile storage may include one or more persistent data storage devices such as a hard drive, optical drive, tape drive, non-volatile solid state device, cloud storage or any other device capable of persistently storing information.

The machine or executable instructions may reside in a software module. The software module may include operating systems and applications. The software module may be compiled or interpreted from a computer program created using a variety of programming languages and/or technologies, including, without limitation, and either alone or in combination, Java, C, C++, C#, Objective C, Fortran, Pascal, Java Script, Python, Perl, and PL/SQL. Non-volatile storage may also include data supporting the functions, features, calculations, and processes.

The controller may also include computer readable storage media, which is inherently non-transitory, may include volatile or non-volatile, and removable and non-removeable tangible media implemented in any method or technology for storage of information, such as computer-readable instructions, data structures, program modules, or other data. Computer readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. Computer readable program instructions may be downloaded to a computer, another type of programmable data processing apparatus, or another device form of a computer readable storage medium or to an external computer or external storage device via a network.

Computer readable program instructions stored in a computer readable medium may be used to direct a computer, other types of programmable data processing apparatus, or other devices to function in a particular manner, such that the instructions stored in the computer readable medium produce an article of manufacture including instructions that implement functions, acts, and/or operations described herein. The functions, acts, and/or operations described herein may be re-ordered, processed serially, and/or processed concurrently.

A method of making a power inductor having a sensor embedded therein is provided. Method 500 includes providing a power inductor core (i.e., step 510). The power inductor core may be made by but not limited to casting, machining, pressing or injection molding (i.e., step 505). A first fixture, i.e., a bobbin may be disposed or positioned on a first portion of the core (i.e., step 520). Then a coil or winding may be disposed or positioned on or around the core adjacent to or cooperatively engaged with the first fixture (i.e., step 530). Then a second fixture, i.e., bobbin may be disposed or positioned on a second portion of the core such that it is adjacent to or cooperatively engaged with the coil or winding (i.e., step 540). The first and second fixture may or may not be cooperatively engaged with one another directly. The bobbin (e.g., first or second fixture) includes a member, arm or appendage with a cavity for housing a senor. The senor may be disposed in the cavity either before or after assembling with the coil and/or on the coil (i.e., step 525). Alternatively, the first and second fixture and coil or winding may be assembled and then disposed or positioned on the core. The bobbin (e.g., fixtures) may be, for example, injection molded. After disposing the sensor in the cavity, it may be potted with, for example, an epoxy or covered with insulation paper to electrically isolate the sensor while providing good thermal conductivity. One or more leads may be connected to the senor prior to or after disposing the sensor in the cavity such as by laser welding. The lead may be routed through a channel or conduit of the bobbin prior to or after connecting it to the sensor. The sensor may be configured to detect or monitor a property (e.g., temperature) of the power inductor when in operation. A controller may be configured to measure the property (e.g., temperature) from the sensor during operation and in response reduce power, stop operation, or start cooling measures if the temperature exceeds a threshold temperature to prevent overheating.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to strength, durability, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A power inductor comprising:

a magnetic core having a first end and a second end;

a bobbin assembly having a first fixture disposed around the first end of the magnetic core and a second fixture having a sensor-enclosure and being disposed around the second end of the magnetic core;

an electrically conductive winding surrounding the magnetic core and disposed between the first and second fixture; and a thermal sensor disposed in the sensor-enclosure and between the magnetic core and the electrically conductive winding to detect a temperature of the power inductor during operation.

2. The power inductor of claim 1, wherein the electrically conductive winding is copper wire.

3. The power inductor of claim 2, further comprising an epoxy potting or insulation paper configured to isolate the thermal sensor from the copper wire winding.

4. The power inductor of claim 1, wherein the second fixture defines a channel and a lead from the thermal sensor is disposed therein.

5. The power inductor of claim 1, wherein the thermal sensor is a thermocouple or thermistor.

6. A vehicle transmission system comprising:

a variable voltage converter (VVC) power inductor having a core, a winding disposed around the core, an injection molded bobbin assembly having an appendage defining a cavity, and a temperature sensor disposed in the cavity such that the temperature sensor is between the core and the winding, the VVC power inductor being in electrical communication with an electrical energy source and an inverter such that the VVC power inductor regulates a voltage of the inverter and the temperature sensor is configured to monitor a temperature of the VVC power inductor during operation.

7. The vehicle transmission system of claim 6, wherein the temperature sensor is fixed between the core and the winding via an injection mold or potting.

8. The vehicle transmission system of claim 7, wherein the potting is an epoxy potting.

9. The vehicle transmission system of claim 6, further comprising a bobbin assembly having a temperature sensor appendage.

10. The vehicle transmission system of claim 9, wherein the temperature sensor appendage defines a cavity with the temperature sensor disposed therein.

11. The vehicle transmission system of claim 10, further comprising an insulation paper or an epoxy potting configured to electrically insulate the temperature sensor in the cavity.

12. The power inductor of claim 9, wherein a lead from the temperature sensor is routed through a channel defined by the bobbin assembly.

13. The power inductor of claim 12, wherein the lead is laser welded to the temperature sensor.

14. The power inductor of claim 9, wherein the bobbin assembly has a first end and a second end, and defines a channel such that the core is disposed within the channel and the winding is disposed between the first and second ends.

15. The power inductor of claim 9, wherein the core and bobbin are injection molded.

16. A power inductor comprising:

a magnetic core having a plurality of sides including a first side and a second side, the first and second sides defining a channel in communication with a first cavity, the first cavity defined in a surface of the first side and configured to house a first sensor, the channel configured to route a plurality of leads from the first sensor out of the second side such that the leads do not need to be bent to exit the channel;

a first thermal sensor disposed in the first cavity and configured to detect a temperature during operation; and an electrically conductive winding surrounding the magnetic core such that the sensor is disposed between the magnetic core and the electrically conductive winding.

17. The power inductor of claim 16, wherein the cavity includes a channel such that one or more leads connected to the sensor are disposed in the channel.

18. The power inductor of claim 16, wherein the first cavity is located on an inner surface of the magnetic core.

19. The power inductor of claim 16, wherein the magnetic core includes a second cavity having a second sensor disposed therein.

20. The power inductor of claim 19, wherein the second sensor is a second thermal sensor.

* * * * *